UNITED STATES PATENT OFFICE.

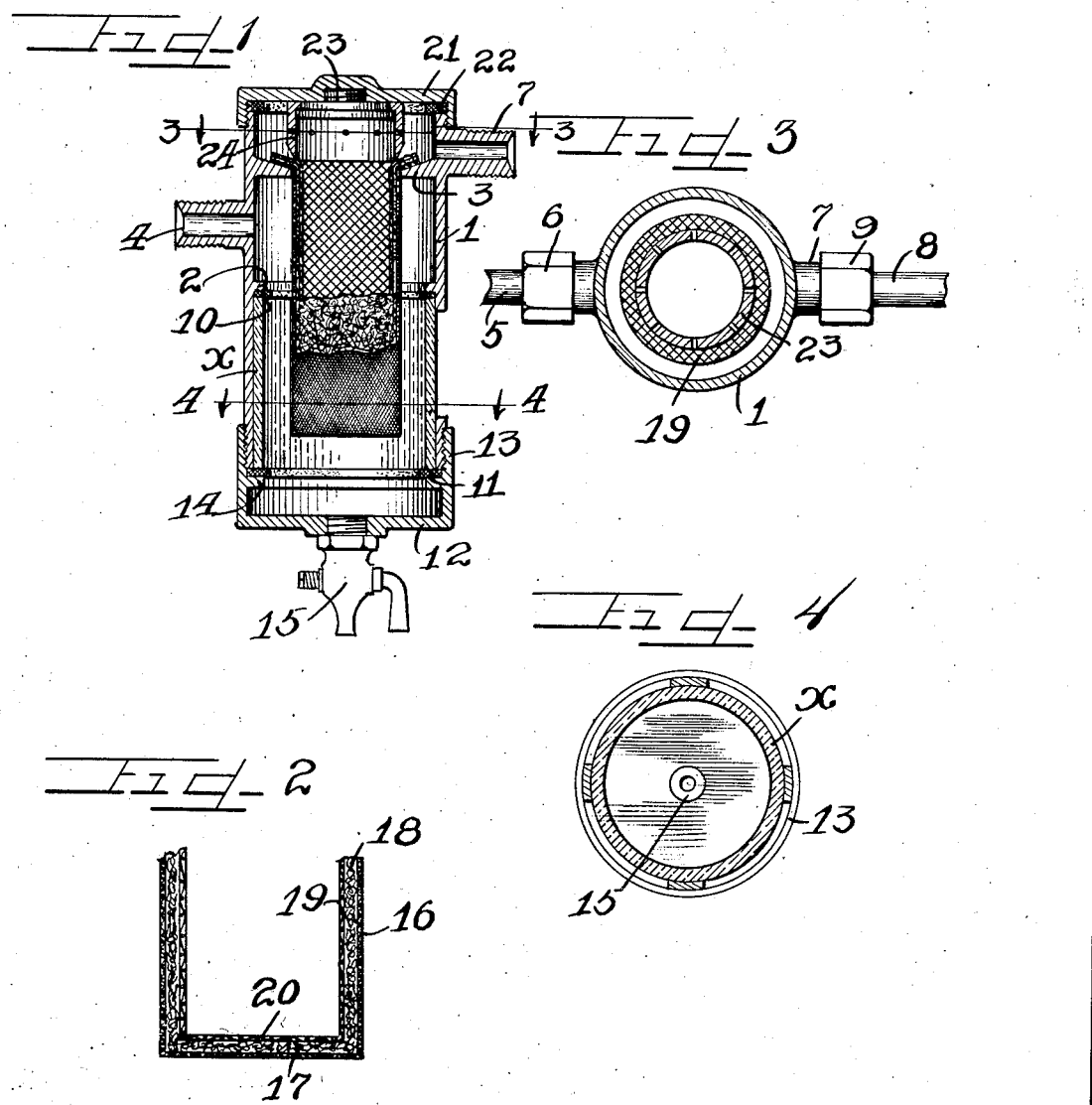

HENRY A. HILLS, OF GRAND RAPIDS, MICHIGAN.

FILTERING DEVICE.

1,113,342.   Specification of Letters Patent.   Patented Oct. 13, 1914.

Application filed June 22, 1912. Serial No. 705,165.

*To all whom it may concern:*

Be it known that I, HENRY A. HILLS, a citizen of the United States, and a resident of the city of Grand Rapids, in the county of Kent and State of Michigan, have invented certain new and useful Improvements in Filtering Devices; and I do hereby declare that the following is a full, clear, and exact description of the same, reference being had to the accompanying drawings, and to the numbers of reference marked thereon, which form a part of this specification.

This invention relates to a filtering device adapted, of course, to be built of any desired size, in large or small units, but is shown more particularly in the form in which constructed for filtering hydro-carbon liquids, as, for example, gasolene, kerosene, or the like.

The object of the invention is to afford an exceedingly simple and compact filter adapted to be made in small sizes, for example, in filtering the gasolene intermediate the storage tank of an internal combustion engine to which the gasolene is delivered through the filter or in the larger units as preferred, as and in connection with such other mechanisms as may be desired in purifying and filtering liquids of any kind.

It is also an object of the invention to afford a construction adapted for use in separating two liquids of different specific gravities, as, for example, water and gasolene, the lighter being delivered through the filter and the heavier being delivered therefrom through a suitable drainage cock at the lower end of the filter.

It is also an object of the invention to afford an exceedingly large filtering surface as compared with the size of the filter as a whole to afford large filtering capacity within a relatively small space.

It is an object of the invention also to afford a construction whereby the lighter liquid is displaced upwardly through the filter and filtering material, and in part by the heavier liquid to be filtered.

The invention embraces numerous novel features and (in a preferred form) is illustrated in the drawings and hereinafter more fully described.

In the drawings: Figure 1 is a central, vertical section of a device embodying my invention, showing the filtering element partly in elevation. Fig. 2 is an enlarged, fragmentary, vertical section of the filtering element. Fig. 3 is a section on line 3—3 of Fig. 1. Fig. 4 is a section on line 4—4 of Fig. 1.

As shown in the drawings: 1, indicates the casing or shell of the filter, which is shown as cylindric and externally threaded at each end thereof. An internal peripheral rib 2, affording a continuous flat, downwardly facing shoulder, is provided near the middle of said casing and near the upper end thereof is provided an inwardly directed peripheral flange or partition 3, affording a central aperture therethrough, and which inclines downwardly and inwardly at its top. Between said rib 2, and partition 3, is the externally threaded inlet nipple 4, adapted to afford connection with the inlet pipe 5, by means of the union nut 6, threaded on said nipple.

Above the partition 3, and, if desired, diametrically opposite from the nipple 4, is the outlet connection 7, also shown as an externally threaded nipple adapted for connection with the outlet pipe 8, by means of the union nut 9, as shown in Fig. 3. Said casing below the rib 2, is provided with relatively large apertures therethrough extending from a point slightly below said rib 2, to near the threaded lower extremity thereof to afford view apertures. Fitting closely in said casing and bearing with its upper end against a packing washer 10, seated on the under side of the rib 2, is a glass tube X, the lower end of which bears against a similar packing washer 11. Threaded on the lower end of the casing is a cap or lower head 12, provided with an internally threaded peripheral flange 13, for engagement with the threaded end of the casing, and provided with an internal peripheral rib 14, affording a seat to engage the packing washer 11, to seal the end of the glass tube X. Connected centrally in said head is a drainage cock 15, adapted to be opened to permit the escape of water and dirt from the device as the filtering progresses.

The filtering element comprises a cylindric screen 16, of comparatively closely woven wire, having a head 17, of similar material connected therein. Said screen is of a diameter to pass through the aperture in the partition 3, and is flared outwardly at the top to rest on the inclined upper face of the partition, as shown in Fig. 1. Fitted in said screen is a bag 18, of comparatively closely woven fabric such as cotton flannel, the side having the nap thereon being turned outwardly. Fitting closely in said bag of cotton flannel and distending the same against the outer walls of the small mesh screen 16, is a coarse mesh wire screen 19, having, as shown, an integral bottom or head therein and at its top also flared outwardly to correspond with the floor of the top of the outer screen. The bag of fabric is thus closely confined within the outer fine screen and inner coarse screen, and also at the outwardly flared portions at the top, as shown in Fig. 1. A cap or upper head 21, is threaded on the upper end of the sleeve to close the same, a suitable packing washer 22, being engaged between the upper edge of the casing and the cap, as shown in Fig. 1.

Rotatably secured by means of a headed screw 23, which engages therethrough and threads into the cap at its center and under side thereof, is a perforated clamping member 24, which is centralized by said screw, and although engaged to the cap thereby, permits the cap to turn freely while said clamping member is retained from rotation. Said clamping member, as shown, is provided with a downwardly directed, substantially sharp edge adapted to bear against the outwardly flared portion of the inner coarse screen and to thereby firmly clamp the upper end of the filtering element on the partition 3, to hold the same at all times firmly in place. A sufficient number of perforations are, of course, provided through said clamping element to permit the gasolene or other hydro-carbon to readily pass therethrough to the discharge port or passage.

The operation is as follows: When the inlet passage in the nipple 4, is connected with a suitable supply pipe, the liquid to be filtered is delivered into the filter below the partition 3, and can only escape therefrom through the outlet passage in the nipple 7, above the partition 3. The filtering material or element becoming saturated with the liquid to be filtered, for example, gasolene or kerosene or any other liquid, said liquid passes freely therethrough, all dirt and refuse being caught on the fine external screen or upon the bag and the water or heavier liquid falls to the bottom of the casing while the gasolene or other liquid to be filtered, rises in the bag and thence passes through the perforations in the clamping member 24, and thence through the passage in the outlet pipe 7.

Filtering may continue for a longer or shorter time without cleansing the device, dependent, of course, upon the impurities or foreign matter in the liquid to be filtered. All dirt and foreign solid matter falls to the bottom of the casing as does also any water than might be contained therein, and this, together with such dirt or foreign solid matter may be drawn off by means of the drain cock 15.

Obviously, from the construction described, the filtering area affords a very large surface, the liquid to be filtered surrounding the same on all sides and the bottom so that the heavier liquid, for example, water, assists in displacing such liquid to be filtered upwardly through the device.

Numerous details of construction may be modified, dependent, of course, upon the size of the device required. Where constructed in large sizes capable of containing a comparatively large quantity of the liquid to be filtered, the general construction may be varied through a considerable degree from that hereinbefore shown and described, which illustrates more particularly one of the smaller sizes of such devices. I have shown, however, but a preferred form of the invention, and therefore do not purpose limiting the patent granted on this application otherwise than necessitated by the prior art.

I claim as my invention:

A filter comprising a casing having an internal annular flange near its upper end, a cylindrical closed bottom filtering element therein having its upper edge flared and supported upon said flange and its lower end free, a removable head for said casing, an annular clamping member carried by said head and having a lower sharp edge adapted to clamp the upper edge of said filtering element upon said flange, and inlet and outlet openings for said casing disposed on opposite sides of said flange.

In testimony whereof I have hereunto subscribed my name in the presence of two subscribing witnesses.

HENRY A. HILLS.

Witnesses:
CHARLES W. HILLS, Jr.,
LAWRENCE REIBSTEIN.